(12) United States Patent
Robinson et al.

(10) Patent No.: US 10,067,642 B1
(45) Date of Patent: Sep. 4, 2018

(54) DYNAMIC DISCOVERY AND PRESENTATION OF CORE PARAMETERS

(71) Applicant: Xilinx, Inc., San Jose, CA (US)

(72) Inventors: David Robinson, Loanhead (GB); Sumit Nagpal, Hyderabad (IN); Prashanth Kumar, Nizamabad (IN); Shreegopal S. Agrawal, Hyderabad (IN)

(73) Assignee: XILINX, INC., San Jose, CA (US)

( * ) Notice: Subject to any disclaimer, the term of this patent is extended or adjusted under 35 U.S.C. 154(b) by 660 days.

(21) Appl. No.: 14/639,768

(22) Filed: Mar. 5, 2015

(51) Int. Cl.
*G06F 17/30* (2006.01)
*G06F 3/0482* (2013.01)
*G06F 9/38* (2018.01)

(52) U.S. Cl.
CPC .......... *G06F 3/0482* (2013.01); *G06F 9/3838* (2013.01)

(58) Field of Classification Search
CPC ...................................................... H04L 41/12
USPC ........................................................ 707/803
See application file for complete search history.

(56) References Cited

U.S. PATENT DOCUMENTS

| | | | | |
|---|---|---|---|---|
| 8,633,730 B1* | 1/2014 | Tseng | ................... | G06F 1/3287 326/38 |
| 2005/0221572 A1* | 10/2005 | Eshun | ...................... | H01C 7/06 438/382 |
| 2005/0251748 A1* | 11/2005 | Gusmorino | ....... | G06F 17/30126 715/713 |
| 2011/0282919 A1* | 11/2011 | Sweeney | ........... | G06F 17/30365 707/805 |
| 2012/0023485 A1* | 1/2012 | Dubey | ...................... | G06F 8/30 717/125 |
| 2012/0117797 A1* | 5/2012 | Stone | ..................... | H01L 24/75 29/832 |

* cited by examiner

*Primary Examiner* — Baoquoc N To
(74) *Attorney, Agent, or Firm* — Kevin T. Cuenot (57) ABSTRACT

Core processing and parameterization may include detecting, using a processor, a super parameter within a core, and, responsive to the detecting, automatically creating, using the processor, a data structure within a memory element having a hierarchy and having a parameter of the core. The data structure may be set as a value of the super parameter of the core.

16 Claims, 5 Drawing Sheets

DYNAMIC DISCOVERY AND PRESENTATION OF CORE PARAMETERS

FIELD OF THE INVENTION

This disclosure relates to integrated circuit design and, more particularly, to using and parameterizing cores.

BACKGROUND

A core, sometimes referred to as an "Intellectual Property (IP)" core, is a reusable unit of circuitry, logic, cell(s), integrated circuit layout design, or a combination of one or more of the aforementioned elements. A core may be specified programmatically in any of a variety of different formats and at a variety of different hierarchical levels. For example, a core may be specified as a synthesizable register transfer level (RTL) description, as a placed and routed portion of a bitstream, or as a lower level description specifying particular transistor layouts. Cores may be used as building blocks within circuit designs for various types of integrated circuits including, but not limited to, application specific ICs (ASICs) and programmable ICs such as field programmable gate arrays (FPGAs).

In many cases, cores have a fixed number of parameters. This is often the case with cores used with programmable ICs. In other cases, however, the number of parameters for a core may be unknown. In still other cases, the number of parameters for a core may be so large that the resulting core becomes unwieldy to parameterize and consumes significant storage space.

SUMMARY

A method includes detecting, using a processor, a super parameter within a core and, responsive to the detecting, automatically creating, using the processor, a data structure within a memory element having a hierarchy and having a parameter of the core. The method also includes setting, using the processor, the data structure as a value of the super parameter of the core.

A non-transitory computer-readable storage medium has instructions stored thereon which, when executed by a processor, perform a method. The method includes detecting a super parameter within a core and, responsive to the detecting, automatically creating a data structure within a memory element having a hierarchy and having a parameter of the core. The method also includes setting the data structure as a value of the super parameter of the core.

A system includes a processor programmed to initiate executable operations and a memory coupled to the processor. The memory includes a core including a super parameter and a data structure independent of the core. The data structure specifies a definition of the core. The data structure includes a plurality of parameters organized into a hierarchy. The super parameter references the data structure. The processor further is programmed to generate a circuit design using the core and the data structure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description with reference to the drawings.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuit (IC) design and, more particularly, to using and parameterizing cores. In accordance with the inventive arrangements described herein, a core may include one or more super parameters. Each super parameter may be expanded dynamically at runtime to specify a hierarchy of parameters for the core. Values may be assigned to the various parameters in the hierarchy.

The resulting hierarchy, inclusive of the assigned values, may be stored in association with the core. Though associated, the hierarchy may be separate and distinct from the core. By dynamically creating the parameter hierarchy, the core need not specify each possible parameter. Rather, the core may be provided in a compact form that consumes significantly less memory than would otherwise be the case. Dynamic parameter creation for the core may then be performed. Dynamic parameter creation may provide, for example, the definition file of the core. The resulting hierarchy may be generated in accordance with the requirement(s) for the core in consideration of a user circuit design.

The inventive arrangements described herein may be implemented as a method or process performed by an apparatus or system such as a data processing system. In another aspect, the inventive arrangements may be implemented as an apparatus or system having a processor. The processor, upon executing program code, performs operations as described herein. In still another aspect, the inventive arrangements may be implemented as a non-transitory computer-readable storage medium storing program code that, when executed, causes a processor to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
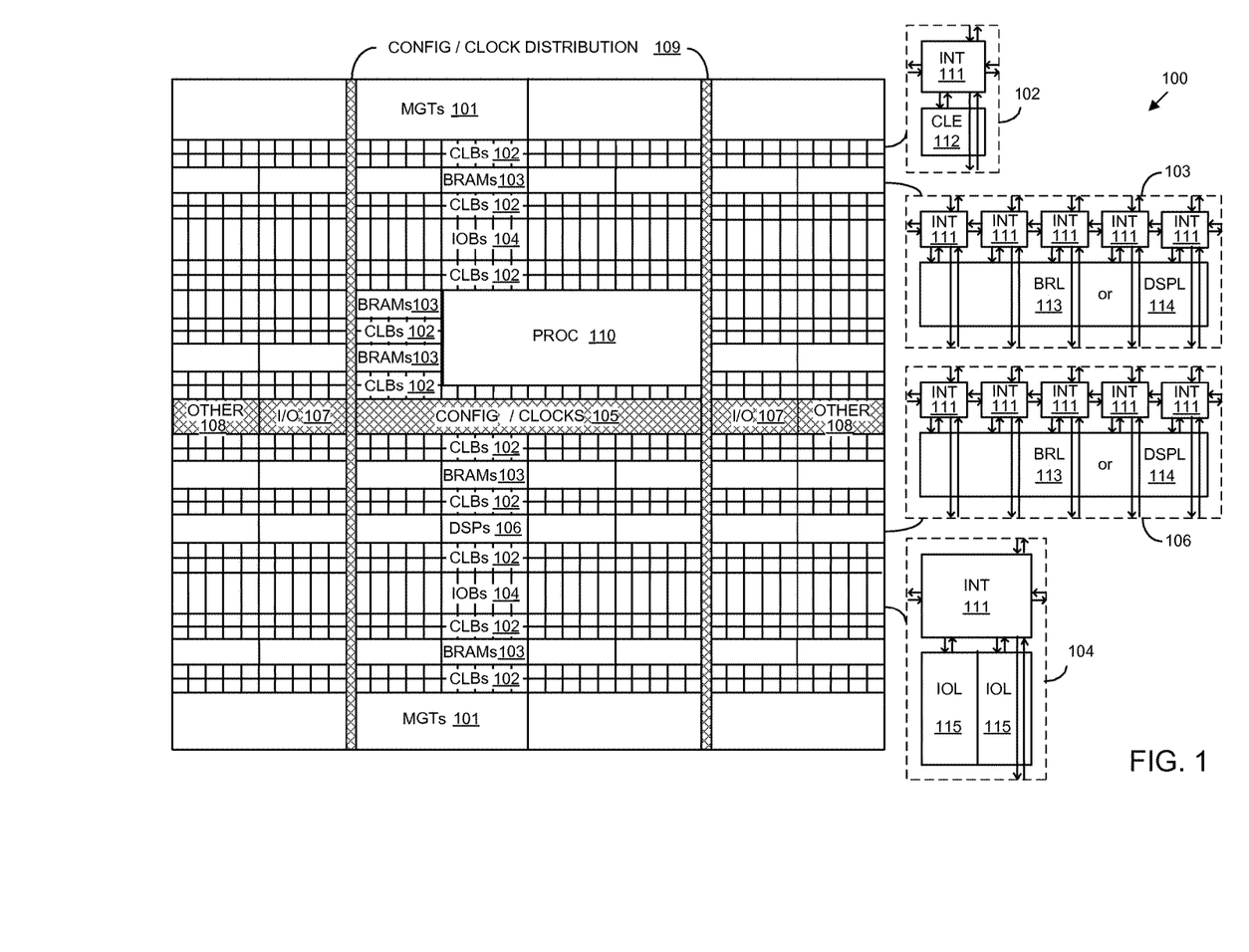
FIG. 1 is a block diagram illustrating an exemplary architecture for an integrated circuit (IC).

FIG. 1 is a block diagram illustrating an exemplary architecture 100 for an IC. In one aspect, architecture 100 is implemented within a programmable IC. For example, architecture 100 may be used to implement a field programmable gate array (FPGA). Architecture 100 is also representative of a system on chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 100 includes several different types of programmable circuit, e.g., logic, blocks. For example, architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105 such as an internal configuration access port (ICAP) and the like, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 may include a configurable logic element (CLE) 112 that may be programmed to implement user logic plus a single INT 111. A BRAM 103 may include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also may be used. A DSP tile 106 may include a DSP logic element (DSPL) 114 in addition to an appropriate number of INTs 111. An IOB 104 may include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die, e.g., formed of regions 105, 107, and 108, may be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks may be programmable blocks and/or dedicated circuitry. For example, a processor block depicted as PROC 110 spans several columns of CLBs and BRAMs.

In one aspect, PROC 110 is implemented as a dedicated circuitry, e.g., as a hardwired processor, that is fabricated as part of the die that implements the programmable circuitry of the IC. PROC 110 may represent any of a variety of different processor types and/or systems ranging in complexity from an individual processor, e.g., a single processing core capable of executing program code, to an entire processor system having one or more processing cores, modules, co-processors, interfaces, or the like.

In another aspect, PROC 110 is omitted from architecture 100 and replaced with one or more of the other varieties of the programmable blocks described. Further, such blocks may be utilized to form a "soft processor" in that the various blocks of programmable circuitry may be used to form a processor that can execute program code as is the case with PROC 110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 1 that are external to PROC 110 such as CLBs 102 and BRAMs 103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream" or "bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 110 or a soft processor. In some cases, architecture 100 includes a dedicated configuration processor that loads the configuration bitstream to the appropriate configuration memory and/or processor memory. The dedicated configuration processor does not execute user-specified program code. In other cases, architecture 100 may utilize PROC 110 to receive the configuration bitstream, load the configuration bitstream into appropriate configuration memory, and/or extract program code for execution.

FIG. 1 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 110 within the IC are for purposes of illustration only and are not intended as limitations.

In creating a circuit design for implementation within an IC having an architecture similar to, or the same as, architecture 100, one or more cores may be used. The cores may be processed with other portions of a circuit design through one or more stages of a design flow to generate the configuration bitstream and/or one or more partial configuration bitstreams.

An IC using architecture 100 or other similar architecture may implement a process called "Partial Reconfiguration." Partial Reconfiguration is a process where a region, or partition, of the IC may be dynamically reconfigured by loading a partial bitstream into the IC. Whereas a configuration bitstream includes configuration data for the entirety of an IC, a partial bitstream or partial configuration bitstream, specifies configuration data for less than the entirety of the IC. For example, a partial bitstream may specify different circuitry and/or a different system than previously implemented in the region designated for partial reconfiguration. The region may undergo modification through partial reconfiguration one or more times while other regions of the IC continue to operate without interruption.

Figure 2:
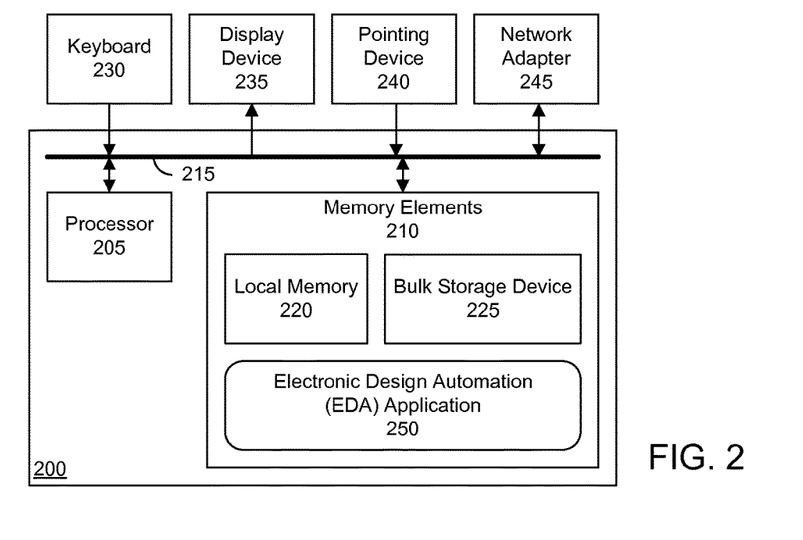
FIG. 2 is a block diagram illustrating an exemplary data processing system.

FIG. 2 is a block diagram illustrating an exemplary data processing system (system) 200. System 200 includes at least one processor 205, e.g., a central processing unit (CPU), coupled to memory elements 210 through a system bus 215 or other suitable circuitry. System 200 stores program code such as an electronic design automation (EDA) application 250, within memory elements 210. Processor 205 executes the program code accessed from memory elements 210 via system bus 215.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), a solid state drive (SSD), or another persistent data storage device. System 200 also may include one or more cache memories (not shown) that provide temporary storage of at least some program code in order to reduce the number of times program code must be retrieved from bulk storage device 225 during execution.

Input/output (I/O) devices such as a keyboard 230, a display device 235, a pointing device 240, and a network adapter optionally may be coupled to system 200. The I/O devices may be coupled to system 200 either directly or through intervening I/O controllers. In some cases, one or more of the I/O devices may be combined as in the case where a touchscreen is used as display device 235. In that case, display device 235 may also implement keyboard 230 and pointing device 240. Network adapter 245 enables system 200 to become coupled to other systems, computer systems, remote printers, and/or remote storage devices through intervening private or public networks. Modems, cable modems, Ethernet cards, wireless transceivers, and/or wireless radios are examples of different types of network adapter 245 that may be used with system 200.

Memory elements 210 store EDA application 250. In one aspect, EDA application 250 may include one or more different components or modules. EDA application 250, being implemented in the form of executable program code, is executed by system 200. As such, EDA application 250 is considered an integrated part of system 200. EDA application 250 and any data items used, generated, and/or operated upon by system 200 while executing EDA application 250 are functional data structures that impart functionality when employed as part of system 200. For example, a circuit design, a core, and/or elements of a core are functional data structures.

In one aspect, system 200 may be a computer that is suitable for storing and/or executing program code. It should be appreciated, however, that system 200 may be any system including a processor and memory that is capable of performing the functions described within this disclosure. System 200 may be implemented as a single system as shown or as a plurality of networked or interconnected systems each having an architecture the same as, or similar to, that of system 200.

In one aspect, system 200 may be used to create circuit designs using one or more cores. The cores may be accessed from a library of cores stored in a data storage device within system 200 or within a data storage device that is accessible by system 200. EDA application 250 may include, or be implemented as, an executable framework. Accordingly, system 200, in executing EDA application 250, may operate upon one or more cores and may parameterize the cores. In general, parameterizing a core refers to the process of determining data items for one or more parameters of the core and/or assigning one or more of the data items to the parameter(s) of the core. For example, the data items may be stored in association with respective ones of the parameters of the core.

As discussed, some cores have a variable number of parameters depending upon the use case specified by the user. For such cores, were all of the possible parameters and parameter combinations fully enumerated within the core itself, the size of the core would be significant (e.g., as measured in bytes). Further, parameterization of the core by a user would be tedious and error prone.

In still other cases, the number components within a core may have no upper bound except for limitations of the particular IC in which the core is to be implemented. Fully enumerating the parameters and parameter combinations of a core with no upper bound for components may not be possible. Even enumerating an acceptable number of parameters and parameter combinations to cover common use cases may make the core too large and difficult to parameterize.

In accordance with the inventive arrangements disclosed herein, system 200 may detect one or more super parameters within a core. In general, a super parameter is a parameter of a core that initially has no value. At runtime, system 200 may dynamically generate a data structure in which parameter values of the core may be stored. System 200 updates the super parameter to specify the dynamically generated data structure as the super parameter value. As such, the parameters and values for the parameters need not be included in the core itself. The parameters may be automatically generated as needed and in accordance with the specific use case of the user.

As an example, consider a core such as a partial reconfiguration controller (PRC) core. A PRC core, when implemented within an IC as a partial reconfiguration controller (PRC), performs management functions for self-controlling partially reconfigurable designs within a programmable IC such as an FPGA. The PRC core is intended for enclosed systems where all of the reconfigurable modules are known to the PRC. In this regard, a user may customize the PRC core to manage a selected number of other entities such as virtual sockets, a selected number of reconfigurable modules per virtual socket, the operation of the PRC core itself, and the interface for the reconfigurable modules.

The PRC core, when implemented within an IC, includes one or more virtual socket managers that manage virtual sockets. As defined herein, the term "virtual socket" means a reconfigurable partition (RP) of an IC in addition to any circuitry that exists in the static logic to assist the RP with partial reconfiguration. For example, circuitry that exists in the static logic to assist the RP may isolate the RP from the static portion of the circuit design while reconfiguration occurs. In another example, the circuitry may ensure that reconfigurable modules (RMs) are in a safe state before the RM(s) are removed from the RP of the IC. In cases where a circuit design does not require the isolation and/or state safeguards discussed, the virtual socket is, in effect, equivalent to an RP.

As defined within this disclosure, the term "reconfigurable partition" or "RP" means an area or region of an IC that may be reconfigured. As such, an RP refers to one or more configurable elements such as LUTs, DSPs, BRAMs, INTs, etc. within a given area of the IC that may be reconfigured. As defined within this disclosure, the term "reconfigurable module" or "RM" means a functional circuit block that is implemented within an RP. Examples of RMs include, but are not limited to, counters, adders, a CPU, a Fast Fourier Transform (FFT) processing circuit, or the like. An RM may be implemented as, or include, one or more partial configuration bitstreams. Thus, an RP may have multiple RMs depending upon the circuits to be implemented within the RP over time. Further, each RM may include one or more partial configuration bitstreams.

Each virtual socket may be paired with a virtual socket manager (VSM). For example, virtual sockets and VSMs may be implemented on a one-to-one basis where the PRC core includes one VSM for each virtual socket. Each VSM connects to a single fetch path. VSMs may operate in parallel and monitor for trigger events. The term "fetch path," as defined herein, means circuitry that fetches or retrieves configuration bitstreams from a memory device storing a configuration library of one or more configuration bitstreams, including partial bitstreams. In one aspect, the memory device may be external to the IC. In another aspect, the memory device may be within the IC. The fetch path sends the configuration bitstreams or partial bitstreams to the ICAP of the IC.

Trigger events may be hardware based or software based. An example of a hardware based trigger event is a signal. An example of a software based trigger event is a register being written. When a trigger event is detected by a VSM, the VSM maps the trigger event to an RM and manages the reconfiguration of the RP with the mapped RM.

As may be observed from the foregoing description, the PRC core is complex and highly configurable. The PRC core is an example of a core that may not have an upper bound for the number of the components included therein. For example, the number of VSMs, triggers per VSM, RMs per VSM, partial bitstreams, etc. may have no upper bound. The number of such components may be bounded simply by the size or other physical features of the particular IC where the PRC core is implemented. As such, the PRC core may not be enumerated in advance of a particular use case and does not have a maximum size in terms of the amount of space that may be needed for storing parameters. To parameterize the PRC core, a user must provide information, e.g., parameters and/or values, for each of the components included therein.

For purposes of illustration, Table 1 below indicates an exemplary number of user parameters for components of the PRC core. It should be appreciated that the number of parameters for each of the components below may also vary according to the particular IC for which the core is intended to operate.

TABLE 1

| PRC Core Component | Number of User Parameters |
|---|---|
| Virtual Socket | 14 |
| Reconfigurable Module (RM) | 6 |
| Partial Bitstream | 2 |

If an IC includes "v" virtual sockets, where each virtual socket has up to "r" RMs, and where each RM has up to "b" bitstreams, the total ($P_{TOT}$) number of user parameters for the PRC core may be expressed as $P_{TOT}=14v+(v*6r)+(v*r*2b)$. Further, if each virtual socket requires one user parameter per trigger event, where "t" is the number of trigger events allowed for each virtual socket, then $P_{TOT}=14v+(v*6r)+(v*r*2b)+vt$.

Because the PRC core models a hierarchy of objects, e.g., components or systems, the addition of one new object such as a virtual socket causes a number of other objects such as reconfigurable modules, bitstreams, and trigger events to be added. In consequence, the number of user parameters for the PRC core may quickly expand and may only be determined in relation to a particular user circuit design. Also, due to the nature of partial reconfiguration, the size of the system to be managed by the PRC core is effectively unbounded. Appreciably, as the size and capacity of programmable ICs continue to grow, the maximum values of v, r, b, and t will likely continue to grow.

Table 2 illustrates the total number of user parameters for different maximum component scenarios. Table 2 illustrates the maximum number of user parameters for a PRC core given different maximum numbers of virtual sockets, RMs per virtual socket, trigger events, and partial bitstreams. As illustrated in Table 2, even modest artificial limits on the maximum number of components results in an unwieldy number of user parameters for the PRC core.

TABLE 2

| Maximum Number of Virtual Sockets | Maximum Number of Reconfigurable Modules per Virtual Socket | Maximum Number of Triggers per Virtual Socket | Maximum Number of Partial Bitstreams per Reconfigurable Module | Number of User Parameters for Core |
|---|---|---|---|---|
| 4 | 4 | 8 | 2 | 248 |
| 64 | 64 | 128 | 2 | 50,048 |

TABLE 2-continued

| Maximum Number of Virtual Sockets | Maximum Number of Reconfigurable Modules per Virtual Socket | Maximum Number of Triggers per Virtual Socket | Maximum Number of Partial Bitstreams per Reconfigurable Module | Number of User Parameters for Core |
|---|---|---|---|---|
| 256 | 256 | 512 | 2 | 790,016 |
| 1024 | 1024 | 2048 | 2 | 12,597,248 |

The program code shown below illustrates an exemplary super parameter definition. For purposes of illustration, the super parameter definition is specified in IP-XACT format. As known, IP-XACT is an extensible markup language (XML) format used to describe electronic components and the design of electronic components. It should be appreciated that the super parameter definition may be specified using any of a variety of different languages, schemas, formats and/or syntaxes. Expression of the super parameter definition using IP-XACT format is for purposes of illustration only and is not intended as a limitation of the inventive arrangements described within this disclosure.

<spirit:parameter>
<spirit:name>superParam</spirit:name>
<spirit:value spirit:resolve="user"
spirit:id="PARAM_VALUE.superParam">None</spirit:value>
</spirit:parameter>

The super parameter has a TYPE of "string" and is unbounded. The super parameter is unbounded meaning that no range is specified. In this example, the super parameter definition further indicates that a "user" resolves the value. It should be appreciated that a super parameter, as included in a core, may have any of a variety identifiers and/or attributes unique to super parameters in general that allow a system such as system 200 to detect the super parameter within a core, e.g., a core definition file, and distinguish the super parameter from other parameters and/or constructs within the core.

Using a super parameter, the core need not include the number of parameters illustrated in Table 2 to accommodate for a worst case scenario. Instead, the super parameter causes a system to automatically generate a data structure. The data structure may provide the definition of the core. The value of the super parameter, which is currently "None," may then be set to the data structure. As such, the super parameter allows the size and complexity of a core to remain small and manageable, while being able to dynamically scale to a user's circuit design needs.

Figure 3:
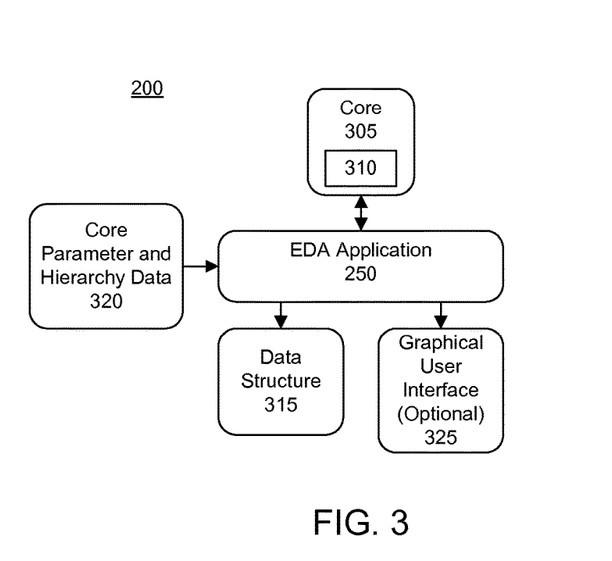
FIG. 3 is a block diagram illustrating super parameter handling by the system of FIG. 2.

FIG. 3 is a block diagram illustrating super parameter handling by system 200. As pictured, EDA application 250 (i.e., system 200 executing EDA application 250) operates upon a core 305. Core 305 includes a super parameter 310. For example, super parameter 310 may be implemented or specified within core 305 as the super parameter definition illustrated above.

A user, working through EDA application 250, may operate upon core 305. EDA application 250 may operate upon core 305 responsive to one or more different events. In one aspect, core 305 may be operated upon responsive to an event where a user request to parameterize core 305 is detected. In another aspect, core 305 may be operated upon responsive to an event where a user request to include core 305 within a circuit design and/or system under development within EDA application 250 is detected. Regardless of the circumstances under which core 305 is operated upon, once core 305 is operated upon, the system and core 305 are said to be in a runtime state.

In response to core 305 entering the runtime state, EDA application 250 may search core 305 for the existence of a super parameter such as super parameter 310. In one aspect, responsive to detecting super parameter 310, EDA application 250 may begin parameterizing core 305. Parameterizing core 305, having super parameter 310, may involve several operations such as dynamically generating data structure 315, populating data structure 315, and/or setting the super parameter value to reference data structure 315.

For example, responsive to detecting super parameter 310, EDA application 250 automatically generates data structure 315. Data structure 315 is initially blank or empty. As defined within this disclosure, a "blank" or "empty" data structure is a data structure where the parameter, or parameters, as the case may be, do not have a data item assigned as a value.

In illustration, a parameter may have one or more properties. One or more of the properties may be a "value" property. In the case of an empty or blank data structure, the value properties of the parameters do not have values or data items assigned thereto. One or more other properties other than the value property of a parameter, however, may have default values assigned thereto within a blank data structure.

In one aspect, system 200 may include core parameter and hierarchy data 320. Core parameter and hierarchy data 320 may specify the particular parameters and/or properties needed and the hierarchy of the parameters and/or properties needed for one or more cores. Core parameter and hierarchy data 320 may be specified on a per-core basis. EDA application 250, responsive to detecting super parameter 310, may lookup core 305 within core parameter and hierarchy data 320 and determine the particular hierarchy and parameters needed for core 305. EDA application 250 may generate data structure 315 in accordance with the hierarchy and parameters located from core parameter and hierarchy data 320. As noted, however, data structure 315 is initially empty.

In one aspect, data structure 315 is fully enumerated by core parameter and hierarchy data 320. For example, the hierarchy, parameters, and properties of data structure 315 may be fixed and fully specified by data structure 315.

In another aspect, the hierarchy, parameters, and/or properties of data structure 315 may be generally, but not fully, enumerated by core parameter and hierarchy data 320. For example, core parameter and hierarchy data 320 may specify one or more rules that dictate the particular parameters that may be included in core 305, properties of the parameters, hierarchical organization of the parameters and/or properties, and the like. The rules may indicate that user input is needed to specify one or more implementation details of the hierarchy specified in data structure 315.

In illustration, the rules of core parameter and hierarchy data 320 may indicate that core 305 may include one or more groups and that each group may include parameters A, B, C, and D. The rules may indicate that the particular number of groups, however, is to be specified by the user. As such, until the user indicates how many groups core 305 is to include, the exact hierarchy of data structure 315 may not be determined.

In some cases, one or more parameters of data structure 315 may have a default value. The default value may be specified by core parameter and hierarchy data 320. For example, one or more properties of a parameter may have default values. The properties may indicate whether the parameter may be edited by a user, whether the parameter may be displayed within a graphical user interface (GUI), or the like.

EDA application 250 further may optionally generate GUI 325. In one aspect, GUI 325 may be generated in accordance with the hierarchy of data structure 315. GUI 325 may have a hierarchy that is the same as the hierarchy of data structure 315. For example, GUI 325 may include a number of top level sections that is equal to the number of top level groups of data structure 315. Further, whether a particular parameter is editable by a user through GUI 325 and/or even visible within GUI 325 may be determined from data structure 315.

In one aspect, a reference to data structure 315 may be inserted as a value within super parameter 310. For example, referring to the prior exemplary super parameter definition, the line "spirit:id="PARAM_VALUE.superParam">None</spirit:value>" may be edited by EDA application 250 by replacing the term "None" with a data item that is a reference to data structure 315. In one example, the reference may be a path such as a Uniform Resource Identifier (URI) and/or file name in which data structure 315 is stored, the name of the object in which data structure 315 is stored, or the like. In this regard, the assignment of the data item referencing data structure 315 as a value for super parameter 310, at least in part, parameterizes core 305.

Below is an exemplary implementation of data structure 315.

```
Group1 {
    Param 1 {
        TYPE <type>
        VALUE <value>
        RANGE_TYPE <type of range>
        RANGE <valid range of value>
        DISPLAY_NAME <name to be shown in the GUI>
        TOOLTIP <description of parameter option>
        ENABLED <allow/disallow changing parameter's value>
        VISIBLE <show/hide parameter in the GUI>
    }
    Group 1.1 {
        Param 1.1 {
            <param details>
        }
        ...
    }
    Param 2 {
        ...
    }
    Group 1.2 {
        ...
    }
}
```

As pictured, parameters, indicated by the term "Param" may be organized beneath groups. A group may include one or more parameters and/or one or more groups. A "sub-group" is a group that is beneath another group within a hierarchy. For example, Group 1 includes group 1.1 and group 1.2, or sub-group 1.1 and sub-group 1.2 as the case may be. Group 1 further includes Para 1. Para 1 includes a plurality of different properties such as TYPE, VALUE, RANGE_TYPE, RANGE, DISPLAY_NAME, TOOLTIP, ENABLED, and VISIBLE.

In one aspect, properties such as DISPLAY_NAME, TOOLTIP, ENABLED, and VISIBLE may have default values specified when data structure 315 is generated. Properties such as DISPLAY_NAME, TOOLTIP, ENABLED, and VISIBLE may be used by system 200 in generating and displaying GUI 325. DISPLAY_NAME may be the name of the property of the parameter that is displayed in GUI 325. TOOLTIP may specify the text of the tool tip that is displayed responsive to a pointer hovering above the parameter as displayed in GUI 325. ENABLED may indicate whether the user may edit the value of the parameter. VISIBLE may indicate whether the parameter will be visible within GUI 325 and, as such, able to be edited by the user through GUI 325.

With reference to the exemplary implementation of data structure 315 above, core parameter and hierarchy data 320 may include one or more rules generally describing the hierarchy or requirements of data structure 315. For example, core parameter and hierarchy data 320 may include rules indicating to EDA application 250 that the data structure to be generated for core 305 should include at least one top level group and that each top level group should include at least one sub-group and a Para 1. The rules may not indicate the particular number of top-level groups and/or sub-groups to be included. Instead, for example, the rules may indicate that the user is to be queried about the number of top level groups and/or sub-groups. The rules further may specify the particular parameters and/or properties included in each sub-group and the like. Referring to the above example, the user may have indicated that core 305 is to include one top level group (i.e., Group 1) and that the top level group is to include two sub-groups (i.e., groups 1.1 and 1.2).

Figure 4:
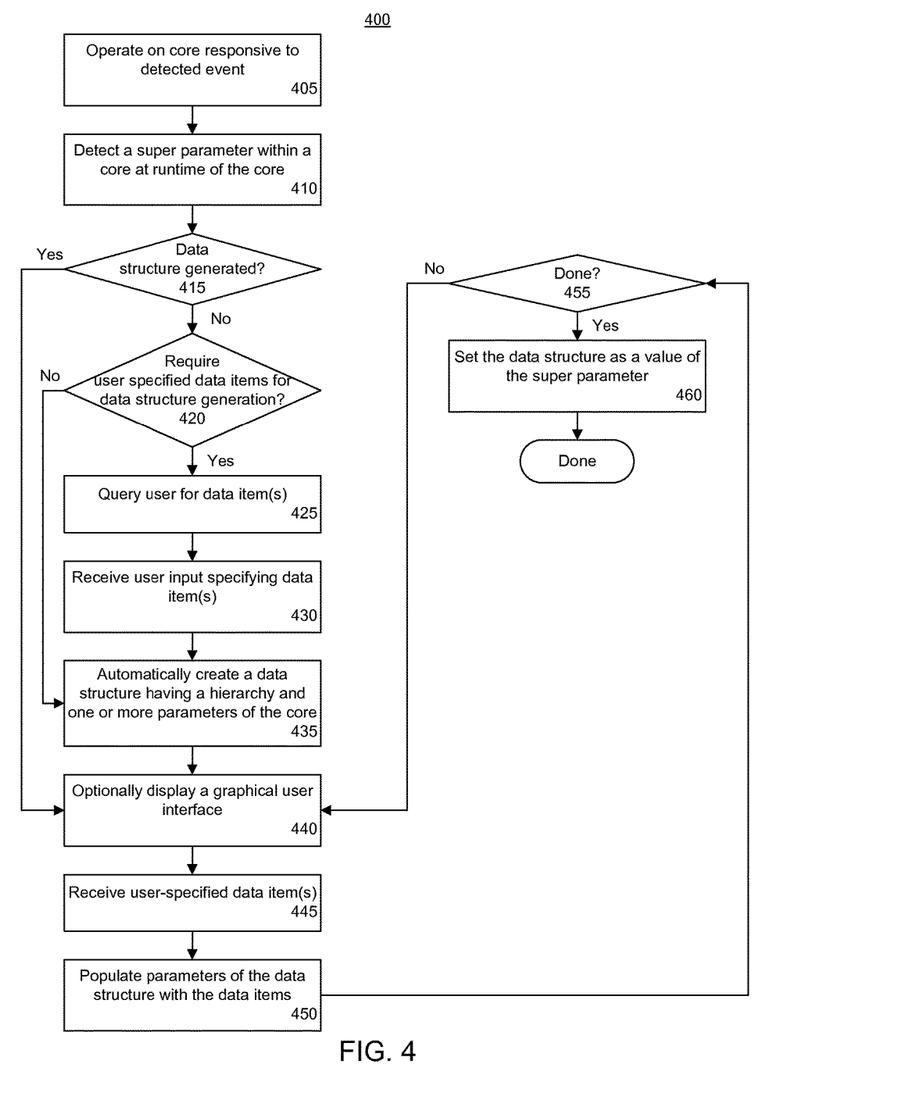
FIG. 4 is a flow chart illustrating an exemplary method of processing a core having a super parameter.

FIG. 4 is a flow chart illustrating an exemplary method 400 of processing a core having a super parameter. More particularly, method 400 illustrates an exemplary method of parameterizing a core including a super parameter. Method 400 may be performed by a system such as system 200 of FIG. 2. In block 405, the system operates upon a core responsive to a detected event. Once block 405 is performed, the system is operating in a runtime state.

In block 410, the system detects a super parameter within the core. The super parameter is detected by the system at runtime. For example, the system may search the core for one of the identifiers and/or attributes used to distinguish a super parameter from other items, constructs, and/or parameters within the core.

In block 415, the system determines whether a data structure has already been generated for the core. If so, method 400 continues to block 440. If not, method 400 proceeds to block 420. In one aspect, the system determines whether a data structure has been generated for the core by determining whether the value of the super parameter is null. A null value indicates that a data structure has not been generated for the core. A non-null value indicates that the system has already generated a data structure for the core. The non-null value, or data item, points to, or references, the previously generated data structure. In that case, the system need only access the prior data structure for the core. The user may change and/or modify one or more parameters of the core by way of blocks 440 and 445 below.

In block 420, the system determines whether any user-specified data items are required in order to generate the data structure for the core. If so, method 400 continues to block 425. If not, method 400 proceeds to block 435.

For example, the system may lookup the core within the core parameter and hierarchy data. The core parameter and hierarchy data may specify whether user input is required and what information the user input is to specify. In cases where the hierarchy of the data structure is dependent upon particular aspects of the user design, the core parameter and hierarchy data for the core may indicate that user input is required. The user input, for example, may specify the number of top level groups, sub-groups, and the like. The user input effectively determines the particular hierarchy of the resulting data structure that is generated.

In cases where the hierarchy is fixed, no user input may be needed. For example, information such as the number of groups and/or sub-groups needed for generating the data structure may be explicitly and fully enumerated within the core parameter and hierarchy data.

In block 425, the system may query the user for the data item(s) needed as determined in block 420. In block 430, the system may receive user input specifying the data item(s) requested in block 425. The data item(s) received may specify a number of groups and/or sub-groups of the data structure that directly coincide, or indicate, the number of particular components and sub-components included in the core when implemented.

In block 435, the system automatically creates a data structure having a hierarchy and one or more parameters for the core. As discussed, in the fixed case, the hierarchy and parameters included in the data structure may be determined from the core parameter and hierarchy data. In the dynamic case, the system may generate the data structure based upon received user input from block 430 and the core parameter and hierarchy data. It should be appreciated that the user-specified number of groups and/or sub-groups may exist at any level of the hierarchy that is to be generated with respect to the data structure, e.g., a top level hierarchy, first sublevel, second sublevel, etc.

In one exemplary implementation, the data structure is initially blank immediately upon creation. The data structure may not specify any data items for the value property of parameters included therein. For other properties of parameters, values may be specified by default as determined from the core parameter and hierarchy data. The system further may persist, or store, the data structure to a memory element. The system may store the data structure within an object or within a file on a bulk storage device.

In block 440, the system optionally displays a GUI. The system may generate the GUI based upon the data structure that is created in block 435 in the case where the super parameter value is null. In the case where the super parameter value is non-null, the system may generate the GUI based upon the previously generated data structure indicated by the non-null value of the super parameter. As discussed, properties of parameters may indicate whether the parameter may be edited by a user, whether the parameter is to be displayed within the GUI, or the like. For example, the system may selectively display the parameter within the GUI according to a default value of a property. The system further may selectively allow a value property of the parameter to be edited through the GUI according to the default value of another property of the parameter. Further, the GUI generated by the system may have a hierarchy that is the same as the hierarchy of the data structure.

In block 445, the system receives one or more user-specified data items. The user-specified data items may be new data items, modifications, including deletions, of prior user-specified data items, or the like. For example, the user may provide data items as values for one or more or all of the value properties of parameters within the data structure. The data items may be received through the GUI optionally generated in block 440. In another aspect, the user may provide a plurality of data items to the system in batch, e.g., from a file that is provided to the system as input where the file includes the data items. It should be appreciated that a user may also provide the values referenced in blocks 430 and 445 in combination, e.g., in batch, at one time rather than as illustrated in FIG. 4.

In block 450, the system populates parameters of the data structure with the data items received in block 445. For example, the system may write the data item received for each parameter to the value property of the respective parameter.

In block 455, the system determines whether the user is done providing user-specified data items. If so, method 400 continues to block 460. If not, method 400 loops back to block 440 to optionally display, or continue to display, the GUI through which further user input(s) may be received. In looping back to block 460, the further user inputs may specify additional data items, changed data items, deleted data items, etc. It should be appreciated that the GUI may be updated responsive to any user input(s) received whether the user input(s) specify values, modify values, delete values, or provide different group(s) and/or sub-group numbers that result in a change to the hierarchy of the data structure and a corresponding change to the GUI itself.

In block 460, the system sets the data structure as a value for the super parameter. The system modifies or updates the super parameter by replacing a value of the super parameter, e.g., the null value or a prior value, with a reference to the current or updated data structure. In cases where the super parameter already specified a value for a data structure, the value of the super parameter may or may not change as a result of block 460. The system may set the data structure as a value for the super parameter automatically.

It should be appreciated that block 460 may be performed at any of a variety of different times. For example, in one aspect, the system may set the value of the super parameter to the data structure immediately responsive to creation of the data structure. In another aspect, the value of the super parameter may be set to the data structure responsive to populating the data structure with one or more user-specified values for parameters, e.g., data items for the value property of parameters, or the like.

Below is exemplary pseudo code illustrating an implementation of a data structure automatically generated by a system such as system 200. For purposes of illustration, a user has requested parameterization of the core. As noted, parameterization of a core including a super parameter may involve generating a data structure to include the parameters, assigning data items to the parameters, and setting the super parameter to reference the generated data structure.

The core, in this example, may be a PRC core as previously described. Responsive to detecting a super parameter within the core, the system may access the core parameter and hierarchy data stored for the PRC core. The system may determine that the hierarchy has a variable number of VSMs, a variable number of RMs in each VSM, and a variable number of partial bitstreams in each RM. As such, the system may query the user for the number of VSMs, the number of RMs in each VSM, and the number of partial bitstreams in each RM for the core. Appreciably, the system further determines the particular parameters and properties needed for the core to be included in the data structure.

In the example described herein with reference to the data structure below, the user indicates that the core will include two VSMs with one VSM having three RMs. The user further indicates that one RM includes two partial bitstreams. In response to receiving the initial information, the system generates a blank data structure similar to the data structure below. For purposes of illustration, only VSM_0 and RM0 are shown in detail. It should be appreciated, however, that the user may specify same, similar, or different information for VSM_1, RM_1, RM_2, VSM_1, and Bitstream_1.

```
VSM_0 {
    Has_Axis_Control {
        TYPE BOOL
        RANGE_TYPE BOOL
        RANGE {0 1}
        VALUE
        DISPLAY_NAME {Has AXIS Control}
        TOOLTIP {Has AXIS Control}
        ENABLED TRUE
        VISIBLE TRUE
    }
    Shutdown_on_error {
        TYPE BOOL
        RANGE_TYPE BOOL
        RANGE {0 1}
        VALUE
        DISPLAY_NAME {Shutdown on Error}
        TOOLTIP {select it if shutdown is required on error}
        ENABLED TRUE
        VISIBLE TRUE
    }
    RM_0 {
        Shutdown_required {
            TYPE STRING
            RANGE_TYPE DISCRETE
            RANGE {No HW HW-SW SW-HW}
            VALUE
            DISPLAY_NAME {Shutdown Required}
            TOOLTIP {Select any option}
            ENABLED TRUE
            VISIBLE TRUE
        }
        Reset_required {
            TYPE STRING
            RANGE_TYPE DISCRETE
            RANGE {No {Active Low} {Active High}}
            VALUE
            DISPLAY_NAME {Reset Required}
            TOOLTIP {Select any option}
            ENABLED TRUE
            VISIBLE TRUE
        }
        Bitstream_0 {
            Address {
                TYPE STRING
                RANGE_TYPE NONE
                RANGE NONE
                VALUE
                DISPLAY_NAME {Address}
                TOOLTIP {Enter the Address}
                ENABLED FALSE
                VISIBLE TRUE
            }
            size_in_bytes {
                TYPE STRING
                RANGE_TYPE NONE
                RANGE NONE
                VALUE
                DISPLAY_NAME {Size in Bytes}
                TOOLTIP {Enter the size in bytes}
                ENABLED FALSE
                VISIBLE TRUE
            }
            Bitstream_1 {
                ...
            }
        }
        RM_1 {
            ...
        }
        RM_2 {
            ...
        }
    }
}
VSM_1 {
    ...
}
```

The system generates the data structure above to include two top level groups of VSM_0 and VSM_1 corresponding to the two VSMs specified by the user. Further, group VSM_0 includes three groups corresponding to the three RMs specified by the user. One RM, as indicated by the user, includes two bitstream groups.

Within the data structure above, a variety of the properties of the parameters have default or predetermined values written by the system as obtained from the core parameter and hierarchy data for the core. It should be appreciated, however, that the VALUE property for the various parameters does not have a data item assigned or written thereto. In this regard, the data structure may be referred to as blank or empty.

With the blank data structure above being automatically generated responsive to detection of the super parameter, the system may also automatically generate a GUI. The GUI may be generated in accordance with the hierarchy of the data structure above and in accordance with the various parameters within the hierarchy.

Figure 5:
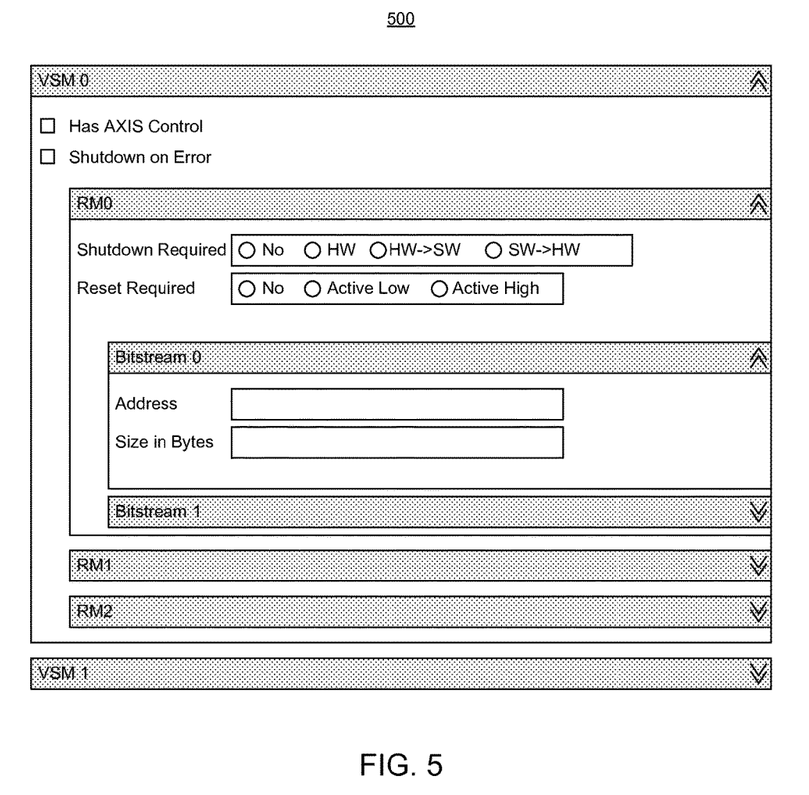
FIG. 5 is a pictorial view of an exemplary graphical user interface.

FIG. 5 is a pictorial view of an exemplary GUI 500. GUI 500 may be automatically generated from the exemplary data structure above and displayed on a display device. As discussed, the hierarchy of GUI 500 matches the hierarchy of the data structure from which GUI 500 is generated.

The system generates GUI 500 to include a top level section of "VSM 0" and "VSM 1" corresponding to top level groups VSM_0 and VSM_1, respectively. For purposes of illustration, section VSM 0 is expanded showing further details therein while section VSM 1 is collapsed. For ease of illustration, no further details are shown and/or discussed with reference to VSM 1. It should be appreciated, however, that VSM_1 may include one or more groups, parameters, sub-groups, and the like that may be displayed within section VSM 1 of GUI 500.

Top level group VSM_0 includes two parameters. The first parameter is called "Has_Axis_Control." The second parameter is called "Shutdown_on_error." Top level group VSM_0 also includes three groups, or sub-groups as the case may be. The three groups are RM_0, RM_1, and RM_2.

Both of parameters "Has_Axis_Control" and "Shutdown_on_error," being located in the top level group VSM_0, are displayed in the top level section of GUI 500 for VSM 0. Both parameters have a plurality of properties defining various aspects of the parameters. For purposes of illustration, the properties of parameters and values of parameters are capitalized while describing GUI 500 in relation to the exemplary data structure above.

For example, both parameters have a TYPE property having a value of BOOL indicating Boolean. Further properties of the parameters include a RANGE_TYPE having a value of BOOL and a RANGE having a value of "0" or "1" in accordance with the RANGE_TYPE property being assigned the value of BOOL. The system determines the type of control element to be used for each parameter based upon the values of properties specified. For example, in the case of parameters with a TYPE property with a value of BOOL, the system may display a checkbox control. Both parameters further have a VALUE property that stores the actual data item that is provided by the user (currently empty).

Additional properties that relate to GUI 500 include the DISPLAY_NAME property having text as a value that is displayed within GUI 500 for the parameter and a TOOLTIP property having text as a value that is displayed as a tool tip for the property responsive to a pointer or other device hovering over the parameter or data input mechanism for the parameter, e.g., the checkbox in this case.

Each parameter also has an ENABLED property and a VISIBLE property. The ENABLED property may have a value of TRUE or FALSE. A TRUE value for the ENABLED property causes the system to permit the user to edit or modify the VALUE property of the parameter. A FALSE value for the ENABLED property causes the system to prevent the user from editing or modifying the VALUE property of the parameter. The VISIBLE property may also have a value of TRUE or FALSE. A TRUE value for the VISIBLE property causes the system to display the parameter within GUI 500. A FALSE value causes the system to hide, not display, or exclude the parameter from GUI 500.

Group RM_0 within top level group VSM_0 includes two parameters and two groups or sub-groups. The two parameters are "Shutdown_required" and "Reset_required." Both parameters have a TYPE property having a value of STRING and a RANGE_TYPE property having a value of DISCRETE. The RANGE property of each parameter provides the selectable values displayed within GUI 500 for the parameter. Both the "Shutdown_required" and "Reset_required" parameters have DISPLAY_NAME and TOOLTIP properties. Further, both of the "Shutdown_required" and "Reset_required" parameters have ENABLED and VISIBLE properties with values of TRUE.

The two groups within RM_0 are Bitstream_0 and Bitstream_1. Within GUI 500, Bitstream 1 is collapsed so the details of Bitstream 1 are not discussed. The group Bitstream_0 includes two parameters called "Address" and "size_in_bytes." Both of the parameters "Address" and "size_in_bytes" have TYPE properties with values of STRING, RANGE_TYPE properties with values of NONE, and RANGE properties with values of NONE. Again, the VALUE properties are blank. Both of the "Address" and "size_in_bytes" parameters have DISPLAY_NAME and TOOLTIP properties. Both of the "Address" and "size_in_bytes" parameters have ENABLED properties with values of TRUE and VISIBLE properties with values of TRUE.

The example below illustrates the state of the data structure responsive to receiving one or more user-specified inputs through GUI 500. For example, within GUI 500, the user may select both the "Has AXIS Control" checkbox control and the "Shutdown on Error" checkbox control. Accordingly, the VALUE property of Has_Axis_Control is now "1" and the VALUE property of "Shutdown_on_error" is now 1. Further, the user may have selected the "No" option for the "Shutdown Required" radio button control and the "No" option for the "Reset Required" radio button control, thereby causing the VALUE property of the "Shutdown Required" parameter to be "No" and the VALUE property of the "Reset Required" parameter to be "No."

```
VSM_0 {
    Has_Axis_Control {
        TYPE BOOL
        RANGE_TYPE BOOL
        RANGE {0 1}
        VALUE 1
        DISPLAY_NAME {Has AXIS Control}
        TOOLTIP {Has AXIS Control}
        ENABLED TRUE
        VISIBLE TRUE
    }
    Shutdown_on_error {
        TYPE BOOL
        RANGE_TYPE BOOL
        RANGE {0 1}
        VALUE 1
        DISPLAY_NAME {Shutdown on Error}
```

-continued

```
        TOOLTIP {select it if shutdown is required on error}
        ENABLED TRUE
        VISIBLE TRUE
    }
    RM_0 {
        Shutdown_required {
            TYPE STRING
            RANGE_TYPE DISCRETE
            RANGE {No HW HW-SW SW-HW}
            VALUE NO
            DISPLAY_NAME {Shutdown Required}
            TOOLTIP {Select any option}
            ENABLED TRUE
            VISIBLE TRUE
        }
        Reset_required {
            TYPE STRING
            RANGE_TYPE DISCRETE
            RANGE {No {Active Low} {Active High}}
            VALUE NO
            DISPLAY_NAME {Reset Required}
            TOOLTIP {Select any option}
            ENABLED TRUE
            VISIBLE TRUE
        }
        Bitstream_0 {
            Address {
                TYPE STRING
                RANGE_TYPE NONE
                RANGE NONE
                VALUE { }
                DISPLAY_NAME {Address}
                TOOLTIP {Enter the Address}
                ENABLED TRUE
                VISIBLE TRUE
            }
            size_in_bytes {
                TYPE STRING
                RANGE_TYPE NONE
                RANGE NONE
                VALUE
                DISPLAY_NAME {Size in Bytes}
                TOOLTIP {Enter the Size in Bytes}
                ENABLED TRUE
                VISIBLE TRUE
            }
            Bitstream_1 {
                ...
            }
        }
        RM_1 {
            ...
        }
        RM_2 {
            ...
        }
    }
    VSM_1 {
        ...
    }
}
```

As discussed, the super parameter may be updated to refer to the data structure. For example, referring to the prior exemplary definition of a super parameter within the core, the "PARAM_VALUE.superParam" may be set to reference the above data structure or the finished data structure, e.g., using a path and/or filename, as opposed to the "None" value originally specified.

Figure 6:
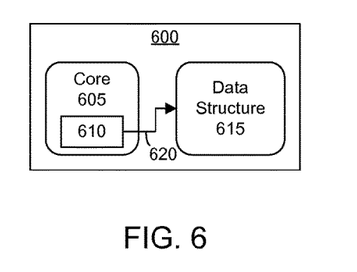
FIG. 6 is a block diagram illustrating an exemplary core architecture.

FIG. 6 is a block diagram illustrating an exemplary core architecture. A computer-readable storage medium 600 includes a core 605 post parameterization. In the example of FIG. 6, a system has identified a super parameter 610 within core 605. The system has generated data structure 615 and written one or more data item(s) to the parameters of data structure 615. Further, the system has updated the value of super parameter 610 to reference data structure 615 as indicated by arrow 620.

For purposes of illustration and not limitation, core 605 may be implemented as a PRC core. Super parameter 610 may be implemented as illustrated within this disclosure. Data structure 615 may be implemented as described herein with reference to the various examples provided. As pictured, core 605 may be one or more file(s) that exist separately and distinctly from the file including data structure 615. The definition of core 605, as implemented by data structure 615, is separate from core 605 itself.

Figure 7:
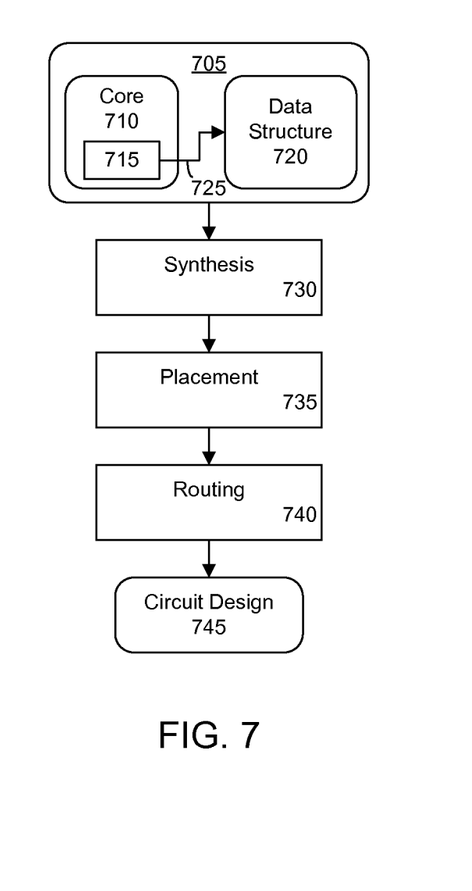
FIG. 7 is a block flow diagram illustrating an exemplary design flow.

FIG. 7 is a block flow diagram illustrating an exemplary design flow 700. Block flow diagram 700 illustrates processing that may be implemented by a system such as system 200 of FIG. 2. As pictured, a circuit design 705 includes a core 710. Core 710 includes a super parameter 715. Super parameter 715 includes a data item that references data structure 720, as illustrated by arrow 725.

The system receives circuit design 705 and, in block 730, performs synthesis. As part of synthesis, the system converts circuit design 705, which may be implemented as an abstract, programmatic description of a circuit, into a low-level design implementation. Synthesis also includes mapping the low-level circuit implementation to circuit elements available on the IC in which the circuit design will be implemented. The IC in which the circuit design will be implemented is referred to as the "target IC."

For example, circuit design 705 may be specified in a hardware description language (HDL). Circuit design 705 may describe the behavior of the circuit and is also referred to as a "behavioral description" or a "register transfer level (RTL) description" of the circuit. The low level design implementation generated through synthesis typically is specified as inter-connected logic gates.

Mapping correlates, or matches, the logic gates of the low-level circuit design to the various types of circuit blocks or resources that are actually available in the target IC. For example, since a lookup table (LUT) may implement a complex function, one or more logic gates of the low level design implementation may be mapped to a single LUT, or other programmable tile of the target IC. The mapped circuit design specifies the same functionality as the low level design implementation, albeit in terms of the particular circuit blocks available on the target IC as opposed to low-level logic gates.

In block 735, the system performs placement. Placement is the process of assigning elements of the mapped circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of the instance of the circuit block and/or resource on the target IC assigned to a circuit element of the circuit design is the location of that circuit element when placed.

In block 740, the system performs routing. Routing is the process of selecting particular routing resources such as wires, PIPs, PIP settings, and/or other interconnect circuitry to electrically couple the various circuit blocks of the target IC.

The system generates circuit design 745, which may be a fully placed and routed circuit design. Circuit design 745 may be output and stored in a memory. In one aspect, circuit design 745 may be specified as a configuration bitstream. In another aspect, circuit design 745 may be loaded into a programmable IC thereby implementing circuitry within the programmable IC. For example, loading circuit design 745 from a system such as system 200 into the target IC implements the particular circuitry specified by core 705 within the target IC.

In accordance with the inventive arrangements described within this disclosure, parameters for a core may be dynamically discovered and generated. A data structure, e.g., an empty data structure, may be dynamically generated to include the parameters for a core. The data structure may be populated with values for the parameters. The value of a super parameter within the core may be set to refer to the automatically generated data structure. In consequence, the size and complexity of the core may be reduced. For example, the core definition need not include each possible parameter for a "worst case" or largest implementation of the core. Rather, the core may be specified and stored in a compact manner.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined within this disclosure, the terms "a" and "an" mean one or more than one. The term "plurality," as defined herein, means two or more than two. The term "another," as defined herein, means at least a second or more. The term "coupled," as defined herein, means connected, whether directly without any intervening elements or indirectly with one or more intervening elements, unless otherwise indicated. Two elements may also be coupled mechanically, electrically, or communicatively linked through a communication channel, pathway, network, or system.

As defined herein, the term "automatically" means without user intervention. As defined herein, the term "user" means a human being. The term "and/or" as defined herein means any and all possible combinations of one or more of the associated listed items. The terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. Although the terms "first," "second," etc. may be used herein to describe various elements, these elements should not be limited by these terms, as these terms are only used to distinguish one element from another unless the context indicates otherwise.

As defined herein, the terms "if," "when," "upon," mean in response to detecting and/or determining or responsive to detecting and/or determining. For example, the phrase "if [a stated condition or event] is detected," means "in response to determining and/or detecting [the stated condition or event]." As defined herein, the terms "in response to" and/or "responsive to" mean responding or reacting readily to an action or event. Thus, if a second action is performed "responsive to" a first action, there is a causal relationship between an occurrence of the first action and an occurrence of the second action, and the term "responsive to" indicates such causal relationship.

One or more aspects described within this disclosure may be realized in hardware or a combination of hardware and software. One or more aspects may be realized in a centralized fashion in one system or in a distributed fashion where different elements are spread across several interconnected systems. Any kind of data processing system or other apparatus adapted for carrying out at least a portion of the methods described herein is suited.

One or more aspects further may be embedded in a computer program product, which includes all the features enabling the implementation of the methods described herein. The computer program product includes a computer-readable data storage medium. As defined herein, the phrase "computer-readable storage medium" means a storage medium that contains or stores program code and/or data for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media such as CDs and/or DVDs, magnetic media such as hard disks, magneto-optical media, computer memory such as random access memory, a bulk storage device, e.g., hard disk, solid state drive, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code may include, but is not limited to, a subroutine, a function, a procedure, an object method, an object implementation, an executable application, an applet, a servlet, source code, object code, a shared library/dynamic load library and/or other sequence of instructions designed for execution on a computer system.

The corresponding structures, materials, acts, and equivalents of all means or step plus function elements in the claims below are intended to include any structure, material, or act for performing the function in combination with other claimed elements as specifically claimed.

A method may include detecting, using a processor, a super parameter within a core and, responsive to the detecting, automatically creating, using the processor, a data structure within a memory element having a hierarchy and including a parameter of the core. The method further may include setting, using the processor, the data structure as a value of the super parameter of the core.

Automatically creating the data structure may include generating the hierarchy to include a number of groups specified by an initial user input. The data structure may be initially empty.

The method also may include populating the parameter of the data structure with a user-specified data item.

In one aspect, a property of the parameter is initially blank upon creation of the data structure. In that case, the method may include receiving a user input specifying a data item and writing the data item to the property of the parameter.

The method also may include displaying a GUI generated from the data structure. In one aspect, the method may include receiving, through the GUI, a user input specifying a data item for the parameter and writing the data item to the parameter. In another aspect, the parameter may include at least one property having a default value. In that case, the method may include selectively displaying the parameter within the GUI according to the default value. In yet another aspect, the parameter may include a first property having a default value. In that case, the method may include selectively allowing a second property of the parameter to be edited through the GUI according to the default value of the first property.

A system includes a processor programmed to initiate executable operations. The executable operations may include detecting a super parameter within a core and, responsive to the detecting, automatically creating a data structure within a memory element having a hierarchy and including a parameter of the core. The executable operations also may include setting the data structure as a value of the super parameter of the core.

Automatically creating the data structure may include generating the hierarchy to include a number of groups specified by an initial user input. The data structure may be initially empty.

The processor may be further programmed to initiate executable operations including populating the parameter of the data structure with a user-specified data item.

In one aspect, a property of the parameter is initially blank upon creation of the data structure. In that case, the processor may be further programmed to initiate executable operations including receiving a user input specifying a data item and writing the data item to the property of the parameter.

The processor may be further programmed to initiate executable operations including displaying a GUI generated from the data structure. In one aspect, the processor is further programmed to initiate executable operations including receiving, through the GUI, a user input specifying a data item for the parameter and writing the data item to the parameter. In another aspect, the parameter may include at least one property having a default value. In that case, the processor may be further programmed to initiate executable operations including selectively displaying the parameter within the GUI according to the default value. In still another aspect, the parameter may include a first property having a default value, wherein the processor is further programmed to initiate executable operations including selectively allowing a second property of the parameter to be edited through the GUI according to the default value of the first property.

A non-transitory computer-readable storage medium having instructions stored thereon which, when executed by a processor, may perform a method. The method may include detecting a super parameter within a core and, responsive to the detecting, automatically creating a data structure within a memory element having a hierarchy and including a parameter of the core. The method also may include setting the data structure as a value of the super parameter of the core.

Automatically creating the data structure may include generating the hierarchy to include a number of groups specified by an initial user input. The data structure may be initially empty.

The method may include populating the parameter of the data structure with a user-specified data item.

The method also may include displaying a GUI generated from the data structure.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
    detecting, using a processor, a super parameter within a core, wherein the super parameter includes a definition indicating that resolution of a value of the super parameter is user dependent;
    expanding the super parameter dynamically at runtime by, responsive to the detecting, querying for a user input specifying a number of groups and automatically creating, using the processor, a data structure within a memory element having a hierarchy including the number of groups, wherein the hierarchy includes a parameter of the core;
    populating the parameter of the core within the data structure with a user-specified data item;
    setting, using the processor, the data structure as a value of the super parameter of the core; and
    displaying a graphical user interface generated from the data structure, wherein the graphical user interface has a hierarchy matching the hierarchy of the data structure.

2. The method of claim 1, wherein the data structure is initially empty.

3. The method of claim 1, wherein a property of the parameter is initially blank upon creation of the data structure, the method further comprising:
    receiving a user input specifying a data item; and
    writing the data item to the property of the parameter.

4. The method of claim 1, further comprising:
    receiving, through the graphical user interface, a user input specifying a data item for the parameter; and
    writing the data item to the parameter.

5. The method of claim 1, wherein the parameter comprises at least one property comprising a default value, the method further comprising:
    selectively displaying the parameter within the graphical user interface according to the default value.

6. The method of claim 1, wherein the parameter comprises a first property comprising a default value, the method further comprising:
    selectively allowing a second property of the parameter to be edited through the graphical user interface according to the default value of the first property.

7. A non-transitory computer-readable storage medium having instructions stored thereon which, when executed by a processor, perform a method comprising:
    detecting a super parameter within a core, wherein the super parameter includes a definition indicating that resolution of a value of the super parameter is user dependent;
    expanding the super parameter dynamically at runtime by, responsive to the detecting, querying for a user input specifying a number of groups and automatically creating a data structure within a memory element having a hierarchy including the number of groups, wherein the hierarchy includes a parameter of the core;
    populating the parameter of the core within the data structure with a user-specified data item;
    setting the data structure as a value of the super parameter of the core; and
    displaying a graphical user interface generated from the data structure, wherein the graphical user interface has a hierarchy matching the hierarchy of the data structure.

8. The non-transitory computer-readable storage medium of claim 7, wherein the data structure is initially empty.

9. The non-transitory computer-readable storage medium of claim 7, wherein a property of the parameter is initially blank upon creation of the data structure, wherein the method further comprises:
    receiving a user input specifying a data item; and
    writing the data item to the property of the parameter.

10. The non-transitory computer-readable storage medium of claim 7, wherein the method further comprises:
    receiving, through the graphical user interface, a user input specifying a data item for the parameter; and
    writing the data item to the parameter.

11. The non-transitory computer-readable storage medium of claim 7, wherein the parameter comprises at least one property comprising a default value, wherein the method further comprises:
    selectively displaying the parameter within the graphical user interface according to the default value.

12. The non-transitory computer-readable storage medium of claim 7, wherein the parameter comprises a first property comprising a default value, wherein the method further comprises:
    selectively allowing a second property of the parameter to be edited through the graphical user interface according to the default value of the first property.

13. A system, comprising:
    a memory configured to store program code; and
    a processor, coupled to the memory, wherein the processor, in response to executing the program code, is configured to initiate operations including:
    detecting a super parameter within a core, wherein the super parameter includes a definition indicating that resolution of a value of the super parameter is user dependent;
    expanding the super parameter dynamically at runtime by, responsive to the detecting, querying for a user input specifying a number of groups and automatically creating a data structure within a memory element having a hierarchy including the number of groups, wherein the hierarchy includes a parameter of the core;
    populating the parameter of the core within the data structure with a user-specified data item;
    setting the data structure as a value of the super parameter of the core; and
    displaying a graphical user interface generated from the data structure, wherein the graphical user interface has a hierarchy matching the hierarchy of the data structure.

14. The system of claim 13, wherein the parameter comprises at least one property comprising a default value, the method further comprising:

selectively displaying the parameter within the graphical user interface according to the default value.

15. The system of claim 13, wherein the processor is further programmed to generate the data structure for the core responsive to a detected event.

16. The system of claim 13, wherein the parameter comprises a first property comprising a default value, the method further comprising:

selectively allowing a second property of the parameter to be edited through the graphical user interface according to the default value of the first property.

\* \* \* \* \*